UNITED STATES PATENT OFFICE.

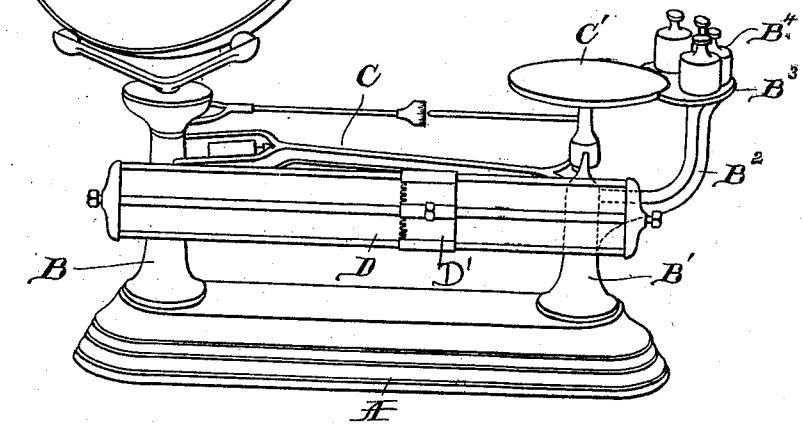
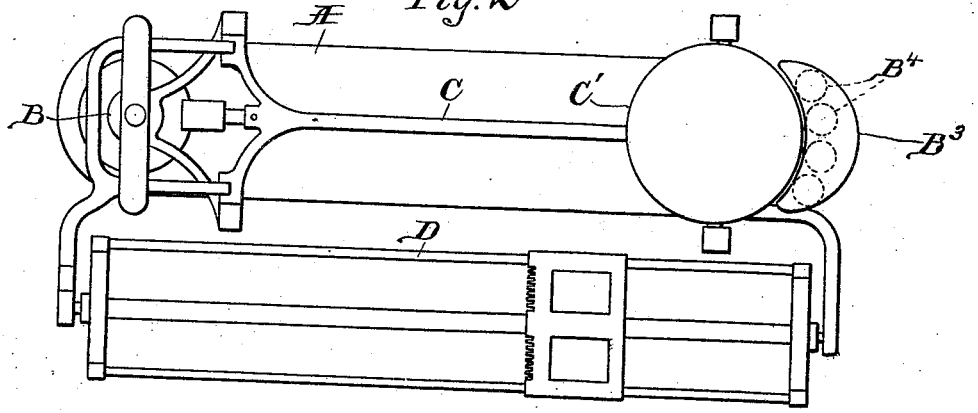

LOUIS JAENICHEN, OF DETROIT, MICHIGAN, ASSIGNOR TO STANDARD COMPUTING SCALE CO., OF DETROIT, MICHIGAN, A CORPORATION OF MICHIGAN.

WEIGHING-SCALE.

No. 901,297.     Specification of Letters Patent.     Patented Oct. 13, 1908.

Original application filed December 24, 1904, Serial No. 238,200. Divided and this application filed April 2, 1907. Serial No. 366,041.

*To all whom it may concern:*

Be it known that I, LOUIS JAENICHEN, citizen of the United States, residing at Detroit, county of Wayne, State of Michigan, have invented a certain new and useful Improvement in Weighing-Scales, and declare the following to be a full, clear, and exact description of the same, such as will enable others skilled in the art to which it pertains to make and use the same, reference being had to the accompanying drawings, which form a part of this specification.

My invention relates to an improvement in weighing scales shown in the accompanying drawings and more particularly set forth in the following specification and claims.

In the drawings: Figure 1 is a perspective view of a weighing scale provided with a computing chart; Fig. 2 is a plan view showing the form of the weight support.

In the drawings, A represents the base of the scale, B and B' the hollow standards rising from the base, and C represents the beam of the scale.

E represents the pan constituting the load-support of the scale and C' represents a small pan at the opposite end on which the weights are placed.

The scale shown in the drawings is what is known as a "four to one", the leverage being four to one.

D represents a chart-beam attached to the main beam of the scale in the usual manner.

D' indicates the lower sliding poise.

B² represents an arm supported on the standard B' and provided at its upper end with a crescent shaped weight-support B³. This weight-support conforms on the inside to the arc of the pan C' and is made only of such width as is necessary to accommodate the weights B⁴.

The object of my invention is to provide means whereby the weights used in connection with the scale may be readily transferred from the weight-support to the weight-pan of the scale without more movement than is necessary, and returned to the weight-support with a like limited movement.

The form of the weight-support shown in this application has been found to be extremely desirable.

This application is a division of the application filed December 24th, 1904, Serial Number 238,200.

What I claim is:—

1. In a scale, the combination of the frame, the weighing-beam and weight-pan, and the crescent shaped weight-shelf supported on a line with the weight-pan, whereby the weight may be transferred from the weight-shelf to the pan by a sliding manual operation, substantially as described.

2. In a scale, the combination of the frame, the weighing beam and weight pan, a post rising from the frame, and provided with a weight-shelf on a line with the weight pan, whereby the weight may be transferred from the weight-shelf to the pan by a sliding manual operation, substantially as described.

3. In a scale, the combination with the weighing beam and weight pan, of a weight shelf partially surrounding the weight pan and in the same horizontal plane therewith when the beam and pan are in equipoise, whereby the weights may be transferred to the weight pan by a sliding manual operation.

4. In a scale, the combination with the beam and weight pan, of a weight shelf arranged adjacent to the weight pan and in the same horizontal plane therewith when said pan and beam are in equipoise, whereby the weights may be transferred to the weight pan by a sliding manual operation.

In testimony whereof, I sign this specification in the presence of two witnesses.

LOUIS JAENICHEN.

Witnesses:
   LEWIS E. FLANDERS,
   HENRY E. VILLEROT.